United States Patent [19]

Hojo et al.

[11] Patent Number: 4,792,676
[45] Date of Patent: Dec. 20, 1988

[54] GYRO APPARATUS WITH A VIBRATION PORTION

[75] Inventors: Takeshi Hojo; Takafumi Nakaishi, both of Kuroiso, Japan

[73] Assignee: Kabushiki Kaisha Tokyo Keiki, Tokyo, Japan

[21] Appl. No.: 920,503

[22] Filed: Oct. 20, 1986

[30] Foreign Application Priority Data

Oct. 22, 1985 [JP] Japan .................................. 60-235831

[51] Int. Cl.⁴ .......................... G01D 5/34; H01J 5/16; G01C 1/10
[52] U.S. Cl. ............................. 250/231 GY; 250/227; 73/653; 73/504; 33/318
[58] Field of Search ............. 250/231 GY, 227, 231 R; 356/149; 73/653, 655, 656, 657, 504, 505; 74/5 R, 5 F, 5.4, 5.22; 33/318

[56] References Cited

U.S. PATENT DOCUMENTS

| 3,486,383 | 12/1969 | Riordan | 74/5.4 |
| 3,709,030 | 1/1973 | Aselman, Jr. | 73/653 |
| 4,019,391 | 4/1977 | Ljung | 73/505 |
| 4,239,963 | 12/1980 | August et al. | 250/231 R |
| 4,277,895 | 7/1981 | Wiklund | 73/517 B |
| 4,458,536 | 7/1984 | Ahn et al. | 73/517 B |
| 4,568,414 | 2/1986 | Oldis et al. | 73/655 |
| 4,590,801 | 5/1986 | Merhav | 73/505 |
| 4,611,491 | 9/1986 | Brown et al. | 73/517 B |
| 4,649,748 | 3/1987 | Fukano et al. | 73/653 |

Primary Examiner—David C. Nelms
Assistant Examiner—Michael Messinger
Attorney, Agent, or Firm—Hill, Van Santen, Steadman & Simpson

[57] ABSTRACT

A gyro apparatus includes a support in a base table for supporting one end of a vibrating member which has a circular cross-section and which is driven by a drive apparatus mounted on the base table to vibrate it in the longitudinal or axial direction. The vibrating member may be light conducting and a light source sends light through it which is projected onto a light detector so as to detect vibrations perpendicular to the axis direction of the vibrating member.

13 Claims, 6 Drawing Sheets

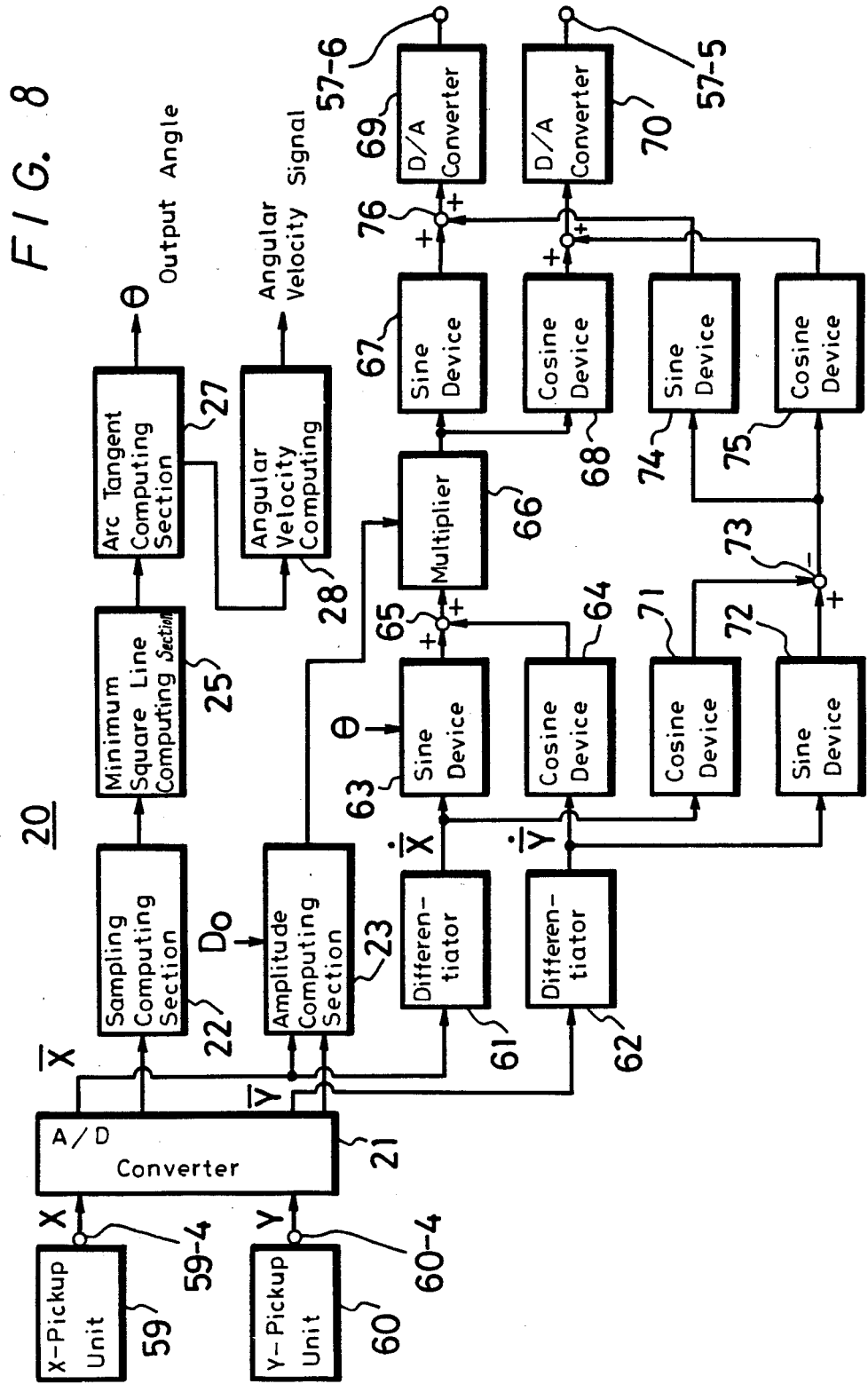

GYRO APPARATUS WITH A VIBRATION PORTION

BACKGROUND OF THE INVENTION

1. Field of the Invention

The present invention relates generally to gyro apparatus and more particularly to a novel gyro apparatus that effectively utilizes the vibration of an inertial body.

2. Description of the Prior Art

The gyro apparatus of this invention is different in principle from prior art gyro apparatus which are based on various systems. Of these prior art gyro apparatus, a vibration-type gyro apparatus, which is relatively similar to the gyro apparatus of the invention in principle and construction, will hereinafter be described briefly with reference to FIG. 1 as a prior art.

FIG. 1 is a perspective view of such prior art vibration-type gyro apparatus. In the illustrated example of FIG. 1, a tuning fork 1 is attached with a flexible shaft 3 to a base table 2. Displacement detectors 6 and drive windings 4 are mounted on the tuning fork 1 at positions near the upper end thereof. The outputs from the displacement detectors 6 are supplied through a drive amplifier 5 to the drive windings 4 and thereby the vibration amplitude of the tuning fork 1 is kept constant. When an angular velocity $\Omega$ is applied around an axis Z—Z of the flexible shaft 3 of the tuning fork 1, there are generated Coriolis' forces Fc corresponding to the vibration velocity v of the tuning fork 1 and the input angular velocity $\Omega$ and the entire tuning fork 1 is alternately rotated around the axis Z—Z by the Coriolis' forces Fc. That is, a twisting vibration is generated in the tuning fork 1.

According to the prior art example shown in FIG. 1, the twisting vibration of this tuning fork 1 is detected by a twisting detector 8, and the detected output from the twisting detector 8 and the output from the drive amplifier 5 are synchronously rectified by a demodulator 7 to thereby detect the input angular velocity $\Omega$, which is the purpose of the gyro apparatus.

However, in such prior art vibration-type gyro apparatus, the Coriolis' forces Fc generated by the input angular velocity $\Omega$ acting on the vibration body such as the tuning fork 1 and the like are converted to an angular displacement and this angular displacement is detected by the twisting detector 8 so that the prior art gyro apparatus has low detection sensitivity. When a piezo-electric element or like is used as the twisting detector 8, the detection sensitivity is considerably affected by the temperature. Further, since fluctuations of the amplitude of the tuning fork 1 affects directly the sensitivity of the gyro, there must be provided a control system for keeping the amplitude of the tuning fork 1 always constant. Furthermore, since the unbalance of the tuning fork 1 itself causes vibrations around the axis Z—Z and causes a bias error in the output, there are many defects in that the precise balancing of the tuning fork 1 must be established, etc. So, it takes much time to adjust the balance of the tuning fork 1, etc.

OBJECTS AND SUMMARY OF THE INVENTION

Accordingly, it is a general object of this invention to provide an improved gyro apparatus.

An object of this invention is to provide a novel gyro apparatus which is formed fundamentally as a rate integrating gyro so that it is possible to obtain a gyro which is very low in drift fluctuation and which has very high precision.

Another object of this invention is to provide a gyro apparatus which is simple in construction, can be manufactured at low cost and has increased efficiency.

Still another object of this invention is to provide a gyro apparatus which has no sliding portion such as a ball bearing portion and so on unlike a mechanical-type gyro so that the gyro is highly reliable and has a long life.

Further object of this invention is to provide a gyro apparatus which has excellent temperature characteristics.

Still further object of this invention is to provide a gyro apparatus which can produce also an angular velocity signal by computing an output of a displacement detecting apparatus.

Still further object of this invention is to provide a gyro apparatus which can prevent the efficiency thereof from being deteriorated by a precession movement and so on.

A yet further object of this invention is to provide a gyro apparatus which is not affected by acceleration.

According to one aspect of the present invention, there is provided a gyro apparatus comprising:

(a) a base table;

(b) a vibration portion having a circular-shaped cross section;

(c) a support provided in said base table and for supporting said vibration portion to be vibrating;

(d) a drive apparatus fixed to said base table and for vibrating said vibration portion in the flexible direction;

(e) a displacement detecting apparatus for detecting a bi-directional displacement of said vibration portion perpendicular to an axis direction of said vibration portion relative to said base table; and (f) a computing apparatus supplied with an output signal from said displacement detecting apparatus and for computing the direction of a vibration surface of said vibration portion relative to said base table.

These and other objects, features and advantages of the present invention will become apparent from the following detailed description of the preferred embodiments taken in conjuction with the accompanying drawings, throughout which like reference numerals designate like elements and parts.

BRIEF DESCRIPTION OF THE DRAWINGS

FIG. 8 is a block diagram showing a computing system and a control system of the gyro apparatus according to the present invention shown in FIG. 3.

DESCRIPTION OF THE PREFERRED EMBODIMENTS

Now, an embodiment of a gyro apparatus according to the present invention will hereinafter be described with reference to FIG. 2.

Figure 1:
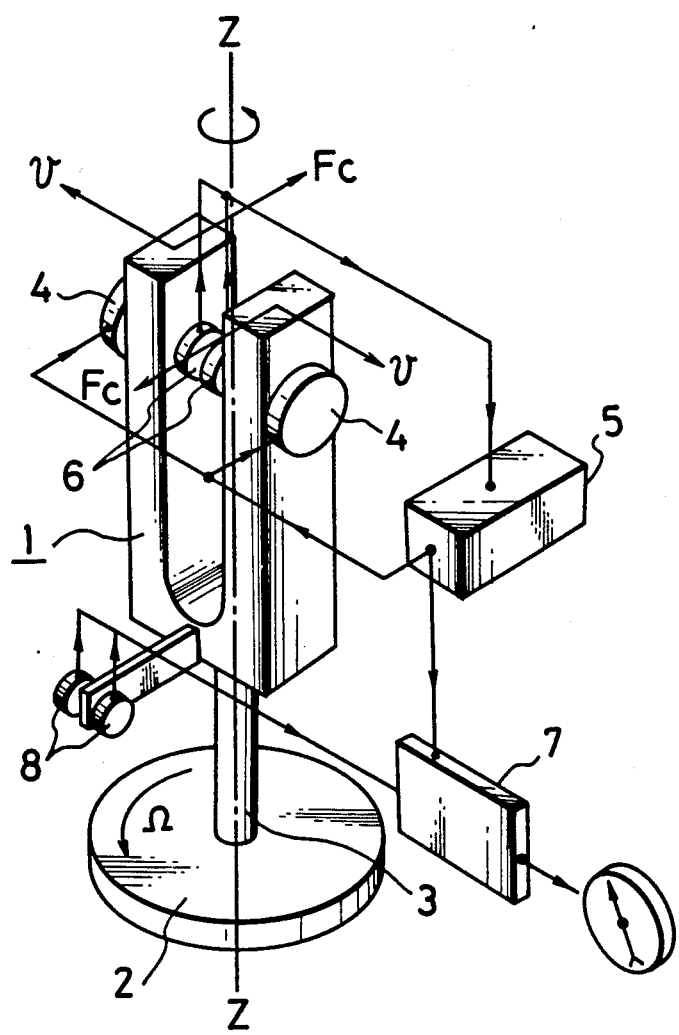
FIG. 1 is a perspective view illustrating an example of a prior art gyro apparatus.
Figure 2:
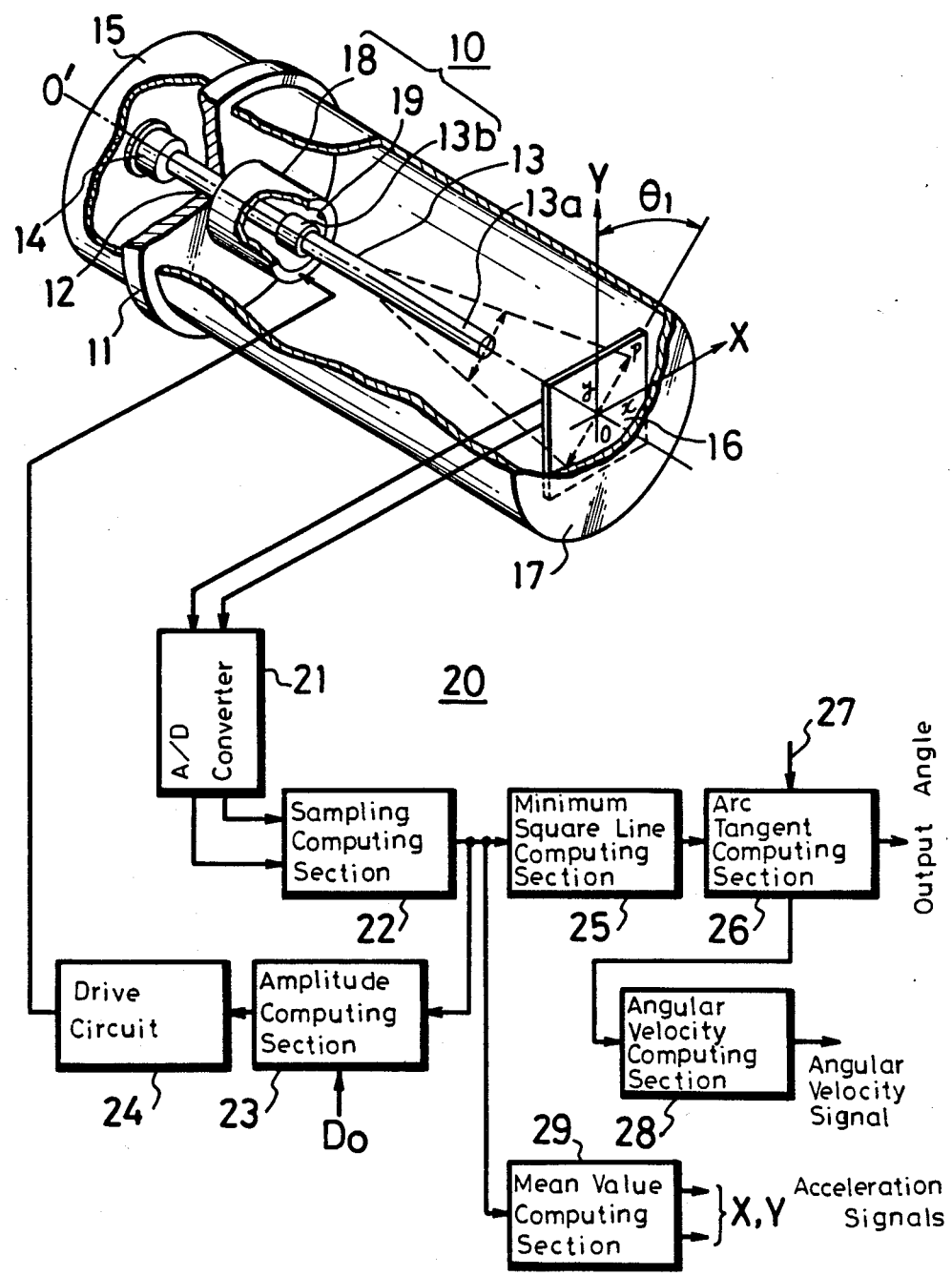
FIG. 2 is a perspective view of an embodiment of a gyro apparatus according to the present invention.

In FIG. 2, reference numeral 11 designates a disc-shaped base table which has a central opening 12. Reference numeral 13 designates a vibratile beam (hereinafter referred to as a vibration beam) made of a transparent resilient material and which has a circular-shaped cross section with a diameter substantially the same as that of the central opening 12. One end portion of this vibration beam 13 is inserted into the central opening 12 and is fixed to the base table 11. The vibration beam 13 can be an optical fiber. A light-emitting element 14 is attached to the end portion of the vibration beam 13 which extends through the opening 12 of the disc-shaped base table 11 and light is projected to one side of the base table 11. This light-emitting element 14 is fixed to the base table 11 with a cup-shaped attaching member 15. A flat plate-shaped optical displacement detecting apparatus 16 which has a 2-dimensional form is fixed to the bas table 11 with a second cup-shaped member 17 in such a manner that with respect to the base table 11 of the vibration beam 13, the center 0 of the apparatus 16 may be substantially placed on the extension of a vibration portion 13a of the vibration beam 13 at the opposite side to the light-emitting element 14. Reference numeral 13b designates an electrode that is provided around the outer periphery of the vibration portion 13a of the vibration beam 13 near its base portion. Reference numeral 19 designates an annular-shaped electrode located concentrically around the outside of the electrode 13b in an opposing relation thereto and which is fixed to the base table 11 with a cylindrical-shaped support member 18. The electrode 13b and the annular-shaped electrode 19 constitute a drive apparatus 10 of an electro-static-type which utilizes electrostatics to produce vibrations of a constant amplitude in the vibration portion 13a of the vibration beam 13.

Light from the light-emitting element 14 travels through the inside of the vibration portion 13a of the vibration beam 13 which is vibrated by the drive apparatus 10 and reaches the surface of the displacement detecting apparatus 16, and is focused thereon to form a light spot P. This light spot P coincides with, when the vibration beam 13 stands still or is not vibrated with the center 0 of the displacement detecting apparatus 16. The x coordinate and y coordinate of the light spot P are converted to electrical signals by the displacement detecting apparatus 16 and are then supplied to an A/D (analog-to-digital) converter 21 in a computing apparatus 20 in which they are converted to digital values or signals. Thereafter, these digital values are supplied to a sampling computing section 22 in which a plurality of pairs of data are sampled per one period of the vibration of the vibration portion 13a of the vibration beam 13. The plurality of the pairs of these data are supplied to an amplitude computing section 23 in which the amplitude of the vibration of the vibration portion 13a of the vibration beam 13 at that time is computed and also this resultant amplitude is compared with a standard amplitude $D_0$. Then, the compared output is fed back via a drive circuit 24 to the drive apparatus 10 whereby such control is carried out such that the amplitude of the vibration portion 13a of the vibration beam 13 is held at substantially the standard or constant value $D_0$.

The plurality of the pairs of data from the sampling computing section 22 are supplied to a minimum square line computing section 25 in which the minimum square line is computed. The thus computed minimum square line is supplied to an arc tangent computing section 26 in which the vibrating direction of the vibration portion 13a of the vibration beam 13 relative to, for example, the Y axis direction is computed from the inclination of the minimum square line.

As described above, even if the apparatus having the vibration beam 13 or vibration portion 13a vibrates in a direction which is inclined relative to the base table 11 by an angle $\theta_1$ from the Y axis is rotated around a central axis which $y=0-0'$ of the vibration beam 13, the direction $\theta_1$ of the vibration plane of the vibration portion 13a of the vibration beam 13 viewed from an inertial coordinate xy system is not changed, that is, the direction of the vibration plane is conserved with respect to the inertial space. This principle or phenomenon was discovered by French physicist, Jean Bernard Léon Foucault, in th century. The apaaratus shown in FIG. 2 applies the above principle (Foucault's pendulum) discovered by Foucault to a gyroscope. According to this apparatus, it is possible to obtain a gyro apparatus in which the vibration locus of the vibrating vibration portion 13a of the vibration beam 13 is detected by the displacement detecting apparatus 16 and the direction of the vibraiion is computed to thereby detect the rotation angle of the apparatus around the axis 0-0'.

In FIG. 2, it is desirable that the inner space formed by the base table 11 and the second cup-shaped member 17 be maintained at vacuum because this allows the energy inputted to the drive apparatus 10 to be reduced and the gyro alternation characteristic can be enhanced and the attenutation of the vibration of the vibration beam 13 will be reduced as much as possible.

Alternatively, if upon actuation of the gyro apparatus or if at any time a reset signal 27 is applied to the arc tangent computing section 26, the output angle thereof can be set at its reference value (for example, 0°). Further, a version is also possible such that the output angle of the arc tangent computing section 26 is supplied to an angular velocity computing section 28 and is thereby differentiated, generating an angular velocity signal.

Furthermore, since the vibration beam 13 and the displacement detecting apparatus 16 constitute an accelerometer, if the data from the sampling computing section 22 is computed in a mean value computing section 29 and the central position of the vibration portion 13a of the vibration beam 13 is computed, it becomes possible to generate X and Y acceleration signals.

In addition, the drive circuit 24 may be fundamentally considered, in the case of FIG. 2, as an AC power source capable of generating a voltage having a frequency which is twice the flexure resonant frequency of the vibration portion 13a and in which the amplitude thereof is controlled such that the amplitude of the vibration of the vibration portion 13a of the vibration beam 13 becomes constant. In addition, the drive circuit 24 may be formed as a self-excitation type oscillation system that is operated on the basis of the amplitude and the phase of the vibration portion 13a of the vibration beam 13.

Figure 3B:
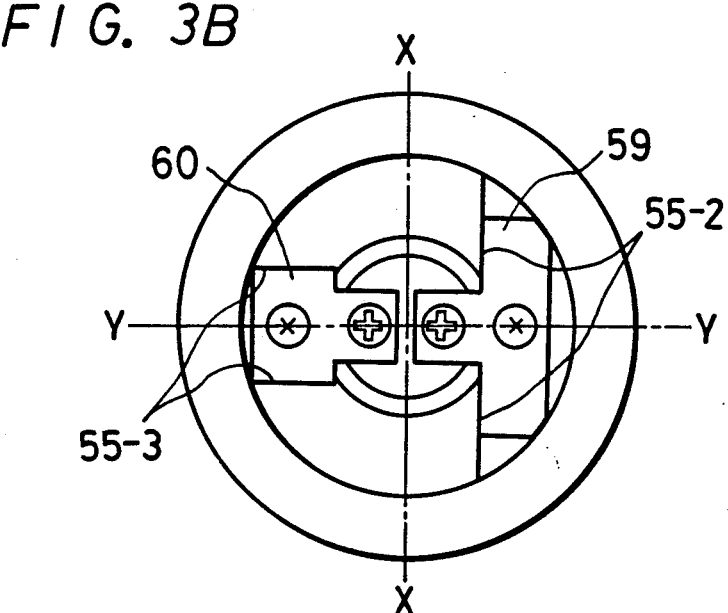
FIGS. 3A and 3B are respectively a cross-sectional view and a top view showing another embodiment of the gyro apparatus according to the present invention.
Figure 3A:
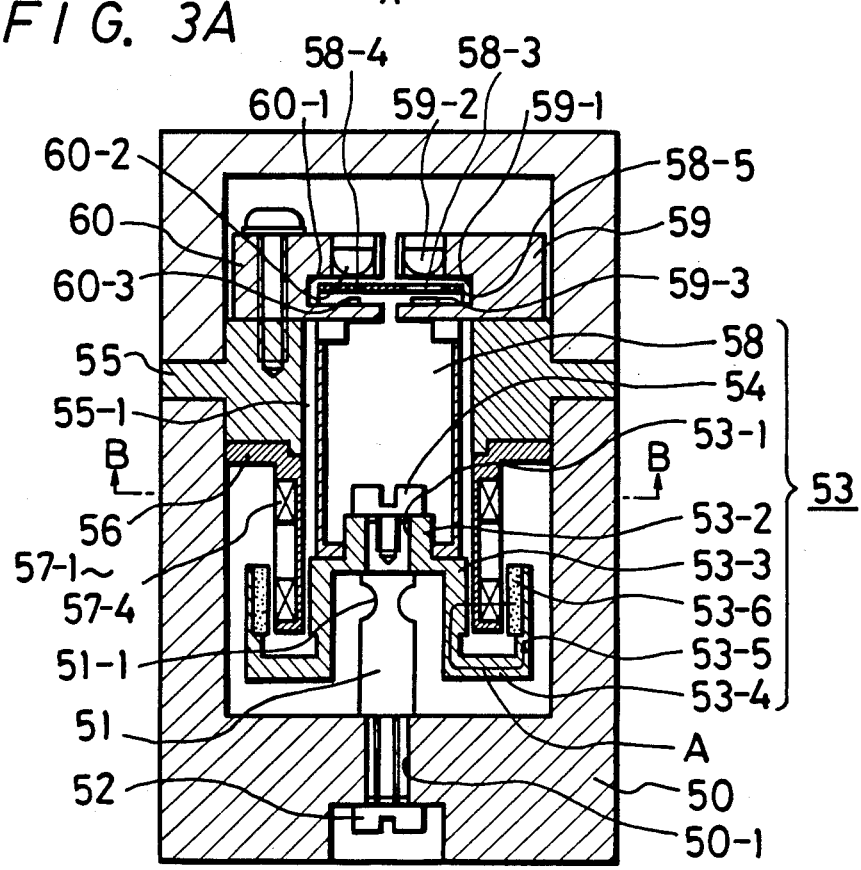

FIGS. 3A and 3B are a cross-sectional view and a top view showing another embodiment of the gyro apparatus according to the present invention.

In FIGS. 3A and 3B, reference numeral 50 denotes a cup-shaped base table. A stud 51 having a constricted and curved flexible portion 51-1 is inserted with its lower end portion into a central opening 50-1 formed through the bottom of the cup-shaped base table 50 and is fixed to the lower surface of the bottom of the cup-shaped base table 50 by a small screw 52. To the upper end portion of the stud 51 located within the cup-shaped base table 50, there is formed a central opening 53-1 through a central boss portion 53-2 of a vibration portion 53 made of material having high magnetic permeability. Thus, the stud 51 and the vibration portion 53 are integrally coupled to each other by a small screw 54. As illustrated in FIGS. 3A and 3B, the vibration portion 53 is further formed of an inner cylindrical portion 53-3, an outer cylindrical portion 53-5, doughnut-shaped disc portion 53-4 couples the inner and outer cylindrical portions 53-3 and 53-5 and a cylindrical magnet 53-6 which is engaged with the inside of the outer cylindrical portion 53-5 and which is magnetized in the radial direction. The above mentioned cylindrical magnet 53-6 generates a magnetic flux shown by an arrow A and forms a magnetic field in the radius direction in the space formed between the inner cylindrical portion 53-3 and the outer cylindrical portion 53-5.

Reference numeral 55 designates a disc-shaped member which has a central opening 55-1. This disc-shaped member 55 is fixed to the upper open end portion of the cup-shaped base table 50. On the lower end surface of the above mentioned disc-shaped member 55, there is attached a cylindrical winding base table 56 on the outer periphery of which 4 windings 57-1, 57-2, 57-3 and 57-4 are fixed.

Figure 4:
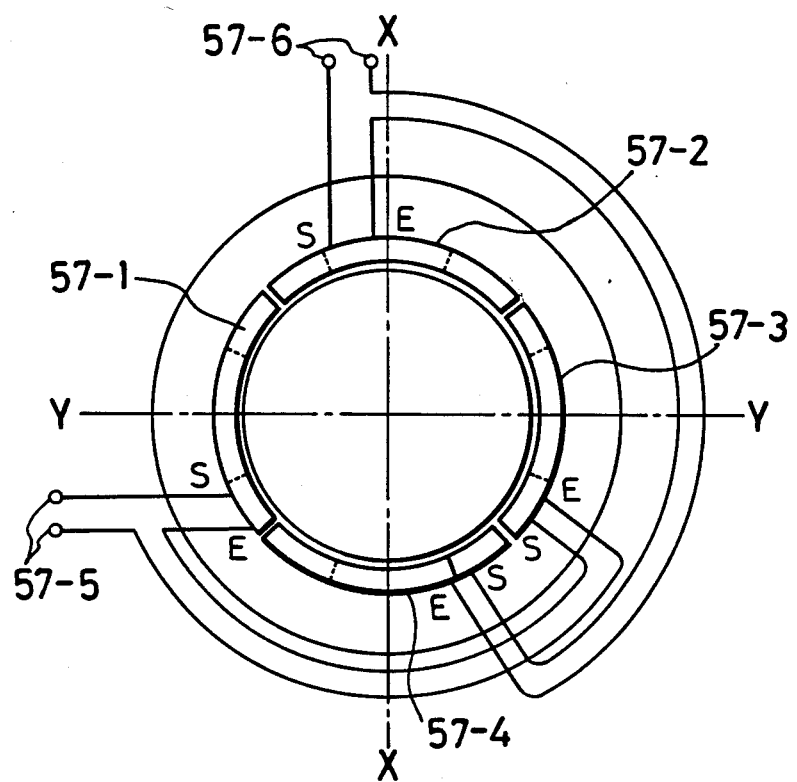
FIG. 4 is a top view of windings which form a torquer used in the embodiment shown in FIG. 3.

FIG. 4 is a top view of the windings 57-1 to 57-4 and shows the connection relationship among them. In FIG. 4, reference letter S designates a point from which the each winding is started, while reference letter E designates a point where each winding ends.

The lower side edge portions of the above mentioned 4 windings 57-1 to 57-4 are located in the magnetic field in the radial direction established by the cylindrical magnet 53-6 of the vibration portion 53. When a predetermined current flows to input terminals 57-5 and 57-6 of the windings 57-1 to 57-4, a torque proportional to the current flowing will be applied to the vibration portion 53 with respect to the X axis and the Y axis in FIG. 4. In other words, the windings 57-1 to 57-4, the cylindrical magnet 53-6, the inner cylindrical portion 53-3, the outer cylindrical portion 53-5 and the doughnut-shaped disc portion 53-4 constitute a torquer.

Figure 5:
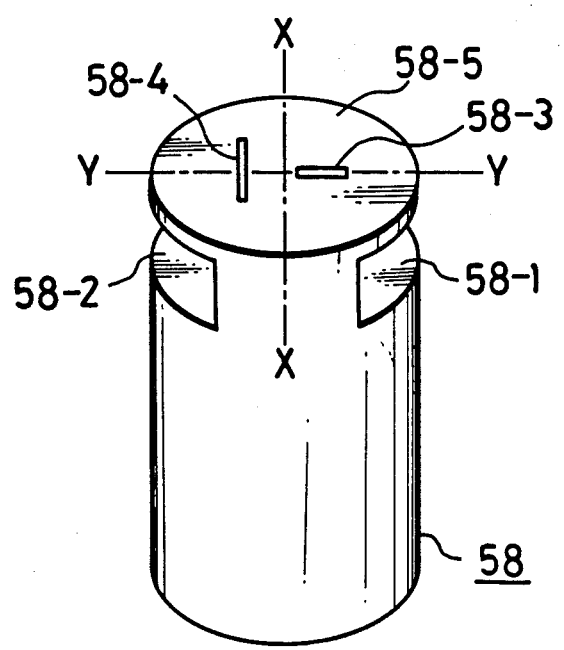
FIG. 5 is a perspective view of a cylindrical-shaped member used in the embodiment shown in FIG. 3.

Turning back to FIGS. 3A and 3B, the vibration portion 53 includes a thin cylindrical-shaped member 58 fixed thereto. This cylindrical-shaped member 58 extends upwardly through the central opening 55-1 of the disc-shaped member 55. FIG. 5 is a perspective view illustrating this cylindrical-shaped member 58.

As illustrated in FIG. 5, the cylindrical-shaped member 58 has formed two cut-out portions 58-1 and 58-2 into which U-shaped portions of the tip ends of X-pickup unit 59 and Y-pickup unit 60 shown in FIG. 3 are inserted. Further, through a disc-shaped portion 58-5 of the cylindrical-shaped portion 58, there are formed X-slit 58-3 and Y-slit 58-4, respectively.

As shown in FIGS. 3A and 3B, the T-shaped X-pickup unit 59 includes a light-emitting element 59-2 which is attached to the upper arm portion of a tip end U-shaped portion 59-1 and an X-light receiving portion 59-3, in which two flat-shaped light receiving elements are arranged so that they are adjacent in the direction perpendicular to the longitudinal direction of the X-slit 58-3 and are, attached to the lower arm portion of the tip end C-shaped portion 59-1. This T-shaped X-pickup unit 59 is fixed to the disc-shaped member 55 at its T-shaped bar portion such that it is urged against an X cut-out portion 55-2 of the disc-shaped member 55.

Figure 6:
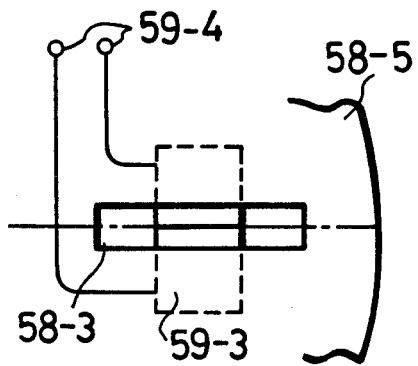
FIG. 6 is a diagram used to explain the principle of a pickup unit used in the embodiment of FIG. 3.

As shown in FIG. 3A, light emitted from the light-emitting element 59-2 passes through the X-slit 58-3 to the X light receiving portion 59-3. When the vibration portion 53 is at the reference position and the X slit 58-3 extends to the center of the X light receiving portion 59-3 as shown in FIG. 6, the light is equally introduced into the two light receiving elements of the X light receiving portion 59-3 and in this case, no voltage is produced across output terminals 59-4. However, if the vibration portion 53 is angularly displaced around the Y axis, the X-slit 58-3 is displaced in the X direction in response to such angular displacement of the vibration portion 53 so that the amount of the light incident on two light receiving elements differs from each other, thus generating a voltage corresponding to the above mentioned angular displacement which is generated across the output terminals 59-4. That is, the X-pickup unit 59 and the X-slit 58-3 form an angular displacement pickup around the Y axis of the vibration portion 53. An I-shaped Y-pickup unit 60 includes a light emitting element 60-2 attached to an upper arm portion of its U-shaped tip end portion 60-1 and an Y light receiving portion 60-3, in which two flat-shaped light receiving elements are arranged to be adjacent in the direction perpendicular to the longitudinal direction of the Y-slit 58-4, which are attached to its lower arm portion. Then, the I-shaped Y-pickup unit 60 is attached to the disc-shaped member 55 such that it may be received into the Y siit 55-3 of the disc-shaped member 55 at its both sides. Since it is obvious that the Y light receiving portion 60-3 which has two light receiving elements and the Y slit 58-4 form, except for the fact that they are mounted at an angle which is different by 90° from the X light receiving portion 59-3 which has the two light receiving elements and the X-slit 58-3, the angular displacement pickup around the X axis of the vibration portion 53, the action of Y pick-up will be similar to that of the X-pickup system.

Figure 7:
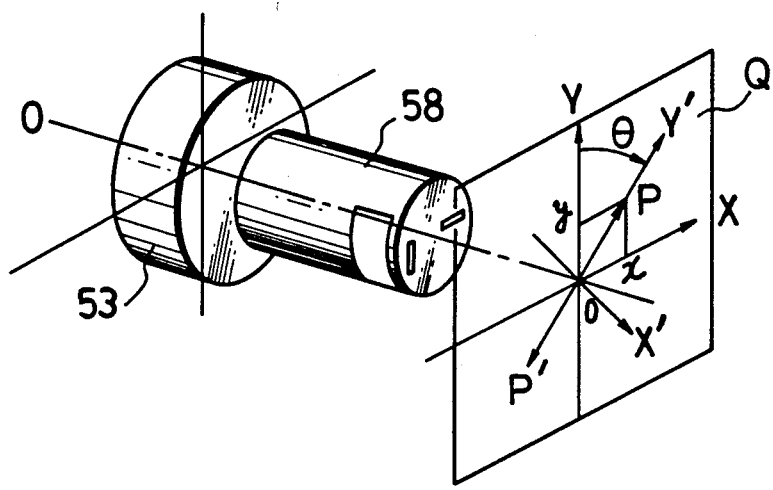
FIG. 7 is a diagram used to explain the principle of the gyro apparatus of the present invention shown in FIG. 3.

FIG. 7 is a perspective view of the vibration portion 53 in its operation state. In FIG. 7, the locus of the center line 0—0 of the vibrating portion 53 is expressed by a locus formed by an intersecting point P of the extension of the center line 0—0 with a plane Q perpendicular to the center line 0—0. In this case, the point P is located on the straight line P-P' and an inclination angle of the straight line P-P' from the 0Y axis on the XY coordinate fixed to the gyro apparatus is indicated by an angle $\theta$.

FIG. 8 is a block diagram showing a control system for the gyro apparatus of the present invention. In FIG. 8, like parts which correspond to those in FIG. 2 are marked with the same reference numerals.

Referring to FIG. 8, output signals from output terminals 59-4 and 60-4 of the X-pickup unit 59 and the Y-pickup unit 60 are converted to digital signals by the A/D converter 21 in the computing apparatus 20. Thereafter, the inclination angle $\theta$ of the locus of the vibration portion 53 is computed by the sampling computing section 22, the minimum square line computing section 25, the arc tangent computing section, etc. and thereby the rotation angle is generated. Due to the Foucault's principle, the direction of the locus of the vibration portion 53 relative to the inertial space is conserved so that the inclination angle θ of the vibration portion 53 relative to the apparatus becomes the rotation angle of the apparatus itself. Hence, this gyro apparatus is operated as a so-called integrating gyro apparatus.

On the other hand, the digitized amounts $\overline{X}$ and $\overline{Y}$ of the X-pickup unit 59 and the Y-pickup unit 60 are differentiated by differentiators 61 and 62 as $\dot{\overline{X}}$ and $\dot{\overline{Y}}$ and multiplied by the sine and the cosine of the output angle θ by a sine device 63 and a cosine device 64, respectively. Then, these multiplied results are added by an adder 65 to each other and converted to the change in the Y direction which is the vibration amplitude direction. Further, a deviation signal from the amplitude computing section 23 which receives the output of the A/D converter 21 is multiplied with the above mentioned added result by a multiplier 66. Thereafter, the amounts resulting from multiplying the above mentioned multiplied output with the sine and cosine of the output angle θ by a sine device 67 and a cosine device 68, which are supplied through D/A (digital-to-analog) converters 69 and 70 to input terminals 57-5 and 57-6 of the windings 57-1 to 57-4 which constitute Y and X torquers. In other words, this control loop has a function to always keep the amplitude of the vibration of the vibration portion 53 constant.

The outputs $\overline{X}$ and $\overline{Y}$ of the differentiators 61 and 62 are multiplied with the cosine and the sine of the output angle θ by a cosine device 71 and a sine device 72 and then, both multiplied outputs are added together by an adder 73 to thereby compute the deviation in the OX′ direction perpendicular to the vibration direction OY′. Thereafter, the deviation is multiplied with the sine and the cosine of the output angle in a sine device 74 and a cosine device 75 and the multiplied outputs are added to the outputs of the afore-mentioned sine device 67 and the cosine device 68 by adders 76 and 77, respectively. That is, according to this control loop, when the oscillator 53 carries out the movement such as the precession movement in the OX′ direction perpendicular to the OY′ direction and so on in addition to the linear movement in the OY′ direction, such precession movement can be attenuated and only the above mentioned linear movement can be carried out.

While in the above mentioned embodiment the signals from the pickup units are digitized, all the circuit elements can be formed of an analog system.

Further, in order to reduce the influence of the accelerations in the X—X and Y—Y directions, the cente of gravity of the vibration portion 53 can be made coincident with the center of the constricted flexible portion 51-1 of the stud 51.

According to the present invention as set forth above, since the vibration direction of the vibration beam is detected directly by the 2-dimensional displacement detecting apparatus, the gyro apparatus of the invention is fundamentally formed as a rate integrating gyro (not a rate gyro) so that a gyro apparatus having a small drift fluctuation and a high accuracy can be obtained.

Since the gyro apparatus of the invention is simplified in construction, it is possible to obtain a gyro which can be manufactured at low cost and which can be enhanced considerably in efficiency.

Further, since the gyro apparatus of the invention is not provided with a sliding member such as a ball bearing and so on unlike a mechanical-type gyro, this invention can provide a gyro which is high in reliability and which has a long life.

Further, since the gyro apparatus of the invention does not use in the detecting system thereof an element such as a piezo-electric element and the like which are very high in temperature sensitivity, it is possible to provide a gyro has excellent temperature characteristics.

Furthermore, according to the present invention, the output of the displacement detecting apparatus is computed so that the angular velocity signal can be produced, too. Also, since there is provided the control system which can attenuate the movement in the direction perpendicular to the vibration direction of the vibration portion, the efficiency of the gyro apparatus can be prevented from being deteriorated by the precessional movement and the like. Thus, a gyro having a high precision can be obtained.

In addition, since the center of gravity of the vibration portion is made coincident with the center of the constricted flexible portion, it becomes possible to obtain a gyro apparatus of high efficiency which can be protected from the influence of the acceleration.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A gyro apparatus comprising:
   (a) a base table;
   (b) a vibration member having a vibration portion with a circular-shaped cross-section;
   (c) a support provided in said base table for supporting one end of said vibration member so as to vibrate said vibration portion of said vibration member relative to said base table;
   (d) a drive apparatus fixed to said base table for vibrating said vibration portion in a direction in a manner such that said direction of vibration of said vibration portion is conserved to be constant with respect to inertial space regardless of the existence or absence of angular rotation which is applied to said base table around an axis direction (0-0′) of said vibration member;
   (e) a displacement detecting apparatus for detecting displacements of said vibration portion in two mutually perpendicular x and y directions which are both perpendicular to said axis direction (0-0′) of said vibration member; and
   (f) a computing apparatus which is supplied with an output signal from said displacement detecting apparatus which computes a vibrating direction of said vibration portion relative to said base table.

2. A gyro apparatus as claimed in claim 1, in which said vibration member is made of a vibratile beam which is a transparent material.

3. A gyro apparatus according to claim 2, further comprising a light emission element fixed to one end of said vibratile beam such that a light emitted from said light emission element passes through said vibratile beam and arrives at said displacement detecting apparatus as a light spot.

4. A gyro apparatus as claimed in claim 1, in which said computing apparatus comprises means for computing an amplitude of said vibration portion, comparing said computed amplitude with a reference amplitude and feeding back a compared result to said drive apparatus to thereby keep the vibration of said vibration portion at a reference value.

5. A gyro apparatus as claimed in claim 1, in which said computing apparatus comprises means for computing and delivering an angular speed applied to said gyro apparatus.

6. A gyro apparatus as claimed in claim 1, in which said computing means comprises means for computing and delivering an acceleration applied to said gyro apparatus.

7. A gyro apparatus comprising:
(a) a base table;
(b) a vibration portion formed so as to become symmetrical with respect to a central axis thereof;
(c) a support with a flexible portion for supporting said vibration portion relative to said base table such that said vibration portion is allowed to be angularly moved around an arbitrary axis perpendicular to said central axis;
(d) a displacement detecting apparatus for detecting an angular displacement of said vibration portion around two axes perpendicular to said central axis and which are perpendicular to each other;
(e) a drive apparatus for applying a torque from said base table to said vibration portion around said two axes; and
(f) a computing apparatus for receiving an output signal from said displacement detecting apparatus and for computing the direction of vibration of said vibration portion relative to said base table.

8. A gyro apparatus as claimed in claim 7, in which said vibration portion is formed of an inner cylindrical portion attached to an upper end of said flexible portion, an outer cylindrical portion and a doughnut-shaped portion which couples lower edge portions of said inner and outer cylindrical portions with a constant clearance between opposing surfaces of said inner and outer cylindrical portions.

9. A gyro apparatus as claimed in claim 8, in which said drive apparatus is a torquer which is formed of a cylindrical magnet attached to an inner surface of said outer cylindrical portion, said inner and outer cylindrical portions, said doughnut-shaped portion and a plurality of windings one end portions of which are located in a space established between the outer surface of said inner cylindrical portion and an inner surface of said cylindrical magnet.

10. A gyro apparatus as claimed in claim 7, in which the center of gravity of said vibration portion is made coincident with a center of said flexible portion.

11. A gyro apparatus as claimed in claim 7, in which said computing apparatus includes means for computing and delivering an angular speed applied to said gyro apparatus.

12. A gyro apparatus as claimed in claim 7, in which said computing apparatus comprises a first control loop for keeping a vibration of said vibration portion relative to said base table constant.

13. A gyro apparatus as claimed in claim 7, in which said computing apparatus comprises a second control loop for attenuating an undesired movement of said vibration portion.

* * * * *